United States Patent [19]
Hynes

[11] 3,827,728
[45] Aug. 6, 1974

[54] PIPE CONNECTORS
[75] Inventor: Joseph H. Hynes, Ojai, Calif.
[73] Assignee: Vetco Offshore Industries, Inc., Ventura, Calif.
[22] Filed: Oct. 30, 1972
[21] Appl. No.: 301,840

[52] U.S. Cl.................... 285/90, 285/309, 285/313
[51] Int. Cl.............................................. F16l 15/00
[58] Field of Search....... 285/34, 90, 137, 141, 143, 285/308, 309, 313, 322, 323, 332, 404

[56] References Cited
UNITED STATES PATENTS

| | | | |
|---|---|---|---|
| 3,345,087 | 10/1067 | Hanes et al. | 285/90 X |
| 3,405,956 | 10/1968 | Pierce, Jr. | 285/90 |
| 3,606,393 | 9/1971 | Huntsinger et al. | 285/90 |

Primary Examiner—Werner H. Schroeder
Attorney, Agent, or Firm—Bernard Kriegel

[57] ABSTRACT

A connector particularly useful in securing sections of an underwater oil well marine riser together, including a pin member received in a box member, the pin and box members being secured together by a plurality of lock dogs, or the like, in the box member forced radially inwardly within a groove in the pin member, the groove and dogs having coengaging cam surfaces exerting an axial thrust between the pin and box members, compressing the pin member against the box in metal-to-metal sealing contact, the pin member being retained in compression to store energy therein and compensate for tensile loads imposed on the pin member so as to maintain the metal-to-metal sealing contact.

14 Claims, 6 Drawing Figures

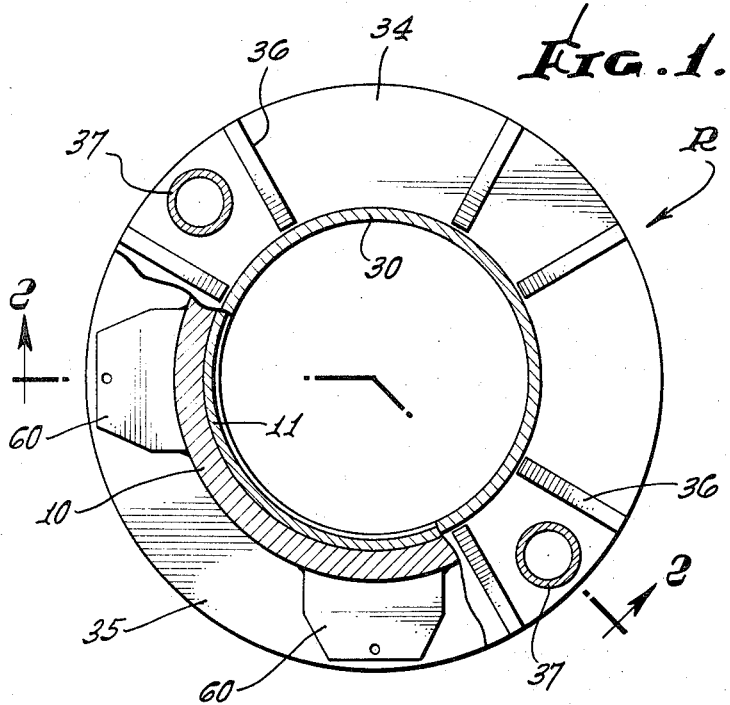
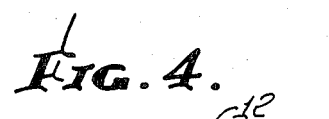
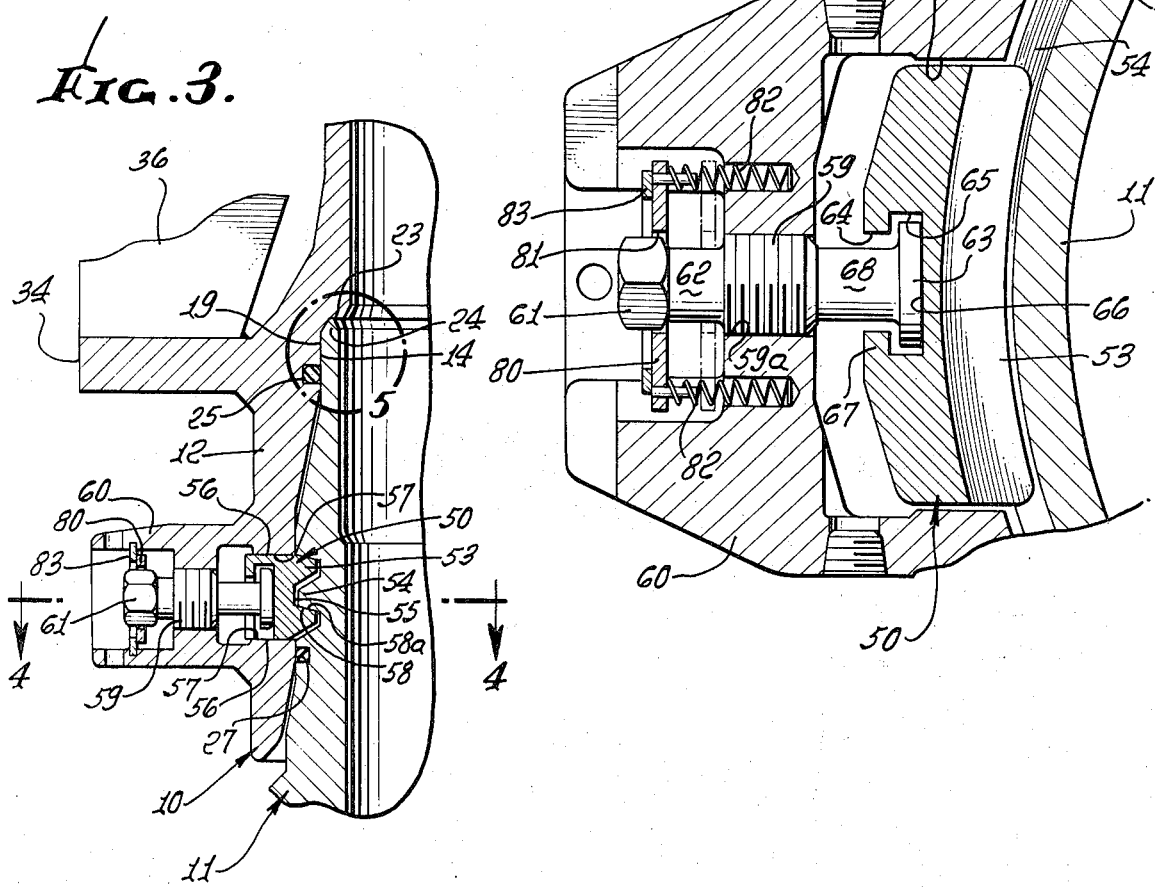

PIPE CONNECTORS

The present invention relates to connectors, and more particularly to connectors for securing adjacent pipe sections together, such as those forming parts of marine risers used in drilling operations from a vessel floating in water.

In the performance of subsea oil and gas drilling operations from floating drilling vessels, a tubular conduit, commonly referred to as a marine riser, is provided that extends from a region adjacent the subsea floor to the drilling vessel. Typically, the conduit will extend upwardly from a position adjacent the top of a subsea blowout preventer stack. The conduit is formed by joining together suitable lengths of pipe through the agency of intervening connectors, a portion of the conduit typically including a telescopic joint and one or more flex joints, as well as accessory equipment.

A connector used for securing sections of a marine riser conduit together is illustrated in U.S. Pat. No. 3,606,393, in which the pin and box members of a connector are secured together through an intervening lock, leakage of fluid between the pin and box being prevented by one or more suitable elastomer side seals. Although pipe connectors, as illustrated in this patent, have operated successfully, under certain conditions, a leak develops in one or more of the seals of one or more of the connectors. In addition, the pin and box portions of a connector do not remain rigidly secured to one another, but tend to become loose or released under relatively large tensile loads and under large bending loads, as well as under a combination of both large bending and tensile loads applied simultaneously. This undesired action increases as marine risers become used in relatively deep water, as, for example, in water depths exceeding 5,000 feet. The marine riser becomes heavier with increased vertical length, slower to run into place, and to remove from its location, with attendant hazards.

By virtue of the present invention, a connector has been provided in which the pin and box members are secured to one another and provide a metal-to-metal sealing contact therebetween. The connector is preloaded to also preload the metal-to-metal sealing engagement between the pin and box members and retain it under compression, so that the subjecting of the connector to a tensile load greater than the preload imposed upon the connector still results in the stored energy in the pin member to continue to force it outwardly and maintain the metal-to-metal seal, as well as to maintain the pin and box members rigidly associated with one another. As a result of the present invention, the connector enables the marine riser to be stronger, yet relatively lighweight, capable of being run at a relatively rapid rate in lowering it in the water and in removing it therefrom, all under safe conditions. The pin and box members can be appropriately secured to one another in a rapid and convenient manner to rigidly lock the pin and box members to one another with the metal-to-metal seal, the connector resisting large tensile and bending loads.

This invention possesses many other advantages and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a horizontal section through a marine riser looking in a downward direction, and with parts broken away and in section;

FIG. 3 is a fragmentary longitudinal section of a portion of the device illustrated in FIG. 2;

FIG. 4 is an enlarged cross-section taken along the line 4—4 on FIG. 3;

Figure 2:
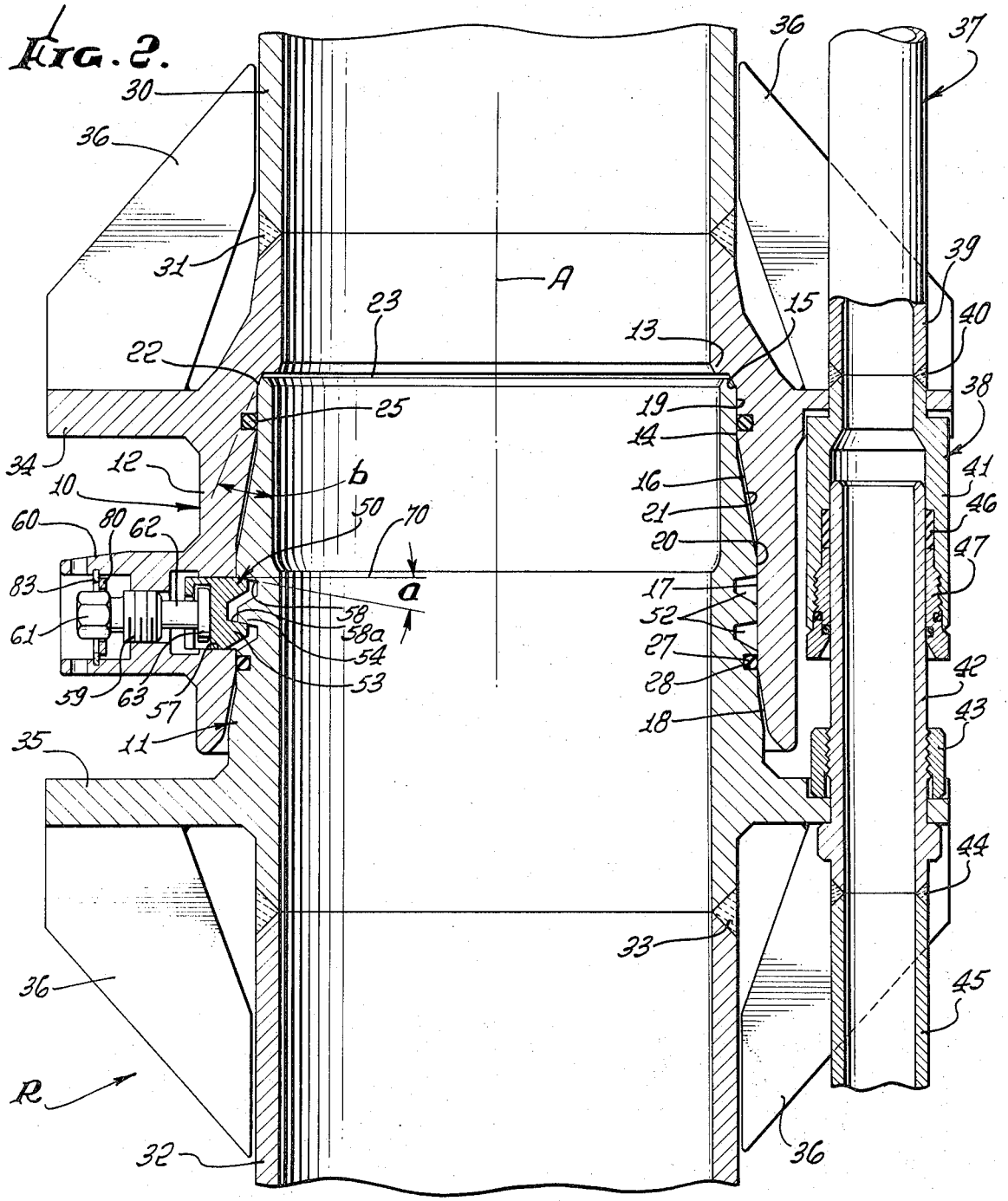
FIG. 2 is an enlarged vertical section taken along the line 2—2 on FIG. 1, the pin member having been inserted in an initial position within the box member.

As illustrated in the drawings, a marine riser R is provided that includes an external or box member 10 adapted to be telescoped over a companion pin member 11. The box member includes a skirt portion 12 having a downwardly facing shoulder 13 normal to its axis A, an upper cylindrical wall 14 terminating below the box shoulder, with an upwardly tapering seat 15 intervening between the upper end of the cylindrical wall and the transverse box shoulder 13. The box member further includes an intermediate or tapered inner wall 16 extending downwardly and outwardly from the upper cylindrical wall, which terminates in a lower cylindrical wall 17, from which a downwardly flaring mouth 18 extends, provided in the lower portion of the box member.

Figure 5:
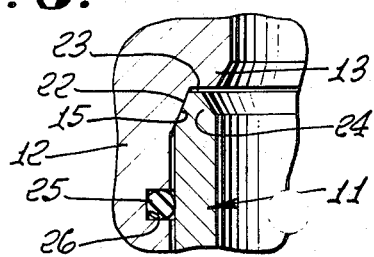
FIG. 5 is an enlarged vertical section, enclosed in the circle 5 of FIG. 3, illustrating the initial contact between the upper tapered end of the pin member and the companion tapered surface in the box member.

The pin member 11 extends upwardly within the box member 10, having upper and lower external cylindrical walls 19, 20 and a tapered external wall 21 therebetween, all of which are companion to the internal walls 14, 17, 16 in the box member. In addition, the upper portion of the pin member has an externally and upwardly tapered surface 22 companion to the tapered seat 15 in the box member, and also a terminal or end 23 normal to the axis A of the connector, but slightly spaced axially from the box shoulder 13 when the tapered surfaces 22, 15 on the pin and box members initially engage (FIG. 5). As described hereinbelow, continued upward force imposed upon the pin member 11 will cause it to shift upwardly along the tapered surface 15 of the box member to deflect the upper portion 24 of the pin member inwardly, as limited by bottoming or engaging of the terminus 23 of the pin against the box shoulder 13. Normally, fluid leakage between the pin and box members is prevented by an upper elastomer seal 25 disposed within an internal circumferential groove 26 in the box member and bearing against the external cylindrical surface 19 of the pin member, and also by a lower elastomer seal ring 27 in an external circumferential groove 28 in the pin member 11 bearing against the internal cylindrical surface 17 of the box member.

As disclosed in the drawings, the upper end of the box member is connected to an upper conduit section 30 by a suitable weld 31 extending circumferentially therearound. Similarly, the lower end of the pin member 11 is secured to a lower conductor or pipe section 32 by a circumferentially continuous weld 33 extending therearound. As specifically disclosed in the drawings, the box member and the pin member have longitudinally spaced horizontal flanges 34, 35 to which are affixed suitable circumferentially spaced tapered guide fins 36. In addition, one or more choke kill lines 37 may extend along the exterior of the marine riser, the fluid conducting path in each of these lines passing through a suitable joint 38 in the connector. As specifically shown, an upper line section 39 is secured, as by welding material 40, to a box member 41 which receives a pin 42 threadedly or otherwise suitably secured to a nut 43 resting upon the lower flange 35, the pin being secured by welding material 44 to a lower line or pipe section 45. A suitable seal 46 is provided between the pin member 42 and box member 41, the seal being held firmly against the box and the pin by a packing nut 47 threaded into the box member. The choke kill lines form no part of the present invention and may be omitted, if desired.

The pin and box members 11, 10 are secured together against longitudinal relative movement by a plurality of circumferentially spaced horizontal lock members or dogs 50 disposed in openings or windows 51 in the box member 10 and adapted to be shifted inwardly into one or more circumferentially continuous external grooves 52 in the pin member 11. Each dog is of substantial arcuate extent, having one or more inwardly directed rib portions 53 adapted to move within the external grooves 52 of the pin member, the intervening rib portion 54 on the pin member being adapted to be received within a groove 55 formed between the lock dog ribs. The dogs 50 are circumferentially spaced from one another, being of a suitable number, such as the four illustrated in the drawings, each dog being of substantial arcuate extent and having top and bottom parallel surfaces 56 adapted to move radially within its window 51 in enagement with companion top and bottom surfaces 57 of the window.

Each dog is adapted to occupy a completely retracted or outward position in which its ribs 53 are disposed entirely within the confines of the window 51. The dog can be shifted radially inwardly to cause its ribs 53 to move into the pin member grooves 52 and into engagement with the upper sides 58 of the grooves. Such inward, and also outward, movement of each dog is secured by providing a screw 59 which is threaded into a boss 60 integral with the box member 10, this screw having an outer head 61 to which a suitable wrench (not shown) can be applied for rotating the screw in both directions, and also possessing a smaller diameter shank 62 terminating in an inner thrust head 63.

The shank 62 can be moved upwardly within a slot 64 in the outer portion of each lock dog 50 when the screw 59 is being assembled to the latter, the larger diameter thrust head 63 moving upwardly within this slot, with its outer margins received within the outer portions of a larger slot portion 65, the thrust head 63 of the screw being adapted to bear inwardly against the base 66 of the larger slot and the outer margins of the head being adapted to engage the opposed outer rib portions 67 of the dog, through which a reduced diameter shank 68 extends, for the purpose of shifting the dog outwardly when the pin and box members are to be released from one another.

In assembling the screw 59 and dog 50 in the apparatus, prior to insertion of the pin member 11 into the box member 10, the inner shank 68 and head 63 of each screw are moved upwardly into the slots 64, 65 opening through the bottom of the dog, and the screw is then inserted through the interior of the box member through the window 51, the screw then being turned in the appropriate direction, as to the left, to thread its screw portion within the companion threaded 59a bore in the boss 60, the outward threading being continued until the lock dog 50 moves completely inwardly of the inner cylindrical wall 17 of the box member. After all of the lock dogs and screws have been assembled within the box member and shifted to their extreme outward positions, the box member 10 can then be disposed over the pin member 11, as to the position disclosed in FIG. 2, and the screw 59 then rotated in the appropriate direction, as to the right, to force the lock dogs 50 into the pin member grooves 52. It is to be noted that the inner portions of each dog are curved to conform to the curvature of the pin member 11, to provide a greater contacting surface between the dog ribs 53 and the upper sides 58 of the pin member grooves.

Figure 6:
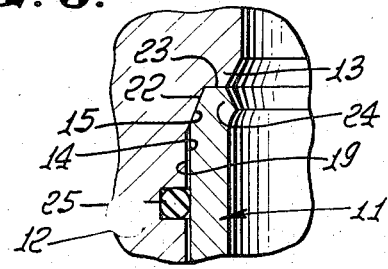
FIG. 6 is a view similar to FIG. 5, illustrating the pin member forced to its final position, in which the pin member is loaded or compressed, the pin member being bottomed against a companion shoulder in the box member.

The upper sides 58a of the ribs and the upper sides 58 of the grooves 52 simultaneously engaged thereby are disposed at an angle $a$ to a plane 70 normal to the common axis A of the pin and box members, such that rotation of the screws 59 to force the lock members 50 inwardly will shift the pin member 11 in an upward direction within the box member 10. Rotation and actuation of the screws will cause the heads 63 to bear against the lock dogs and shift their tapered surfaces 58a against the tapered surfaces 58 on the pin member, until the tapered end 22 on the pin member engages the tapered seat 15 in the box member (FIG. 5). Continued application of torque to the screws 59 will further shift the dogs inwardly and will effect an inward deflection of the upper end portion 24 of the pin member inwardly until the upper end 23 of the pin member bottoms against the box shoulder 13, the parts then occupying the position illustrated generally in FIG. 6. After this occurs, the screws 59 can be further tightened to place them under additional compression, acting through the companion tapered surfaces 58a, 58 to exert an additional compressive force or preloading between the end portion 24 of the pin member and the box shoulder 13 and seat 15.

During the forcing of the pin member upwardly to cause its tapered end portion 24 to be compressed inwardly by the tapered seat 15 in the box member, the pin member is being compressed and has energy stored into it. After the end 23 of the pin member engages the box shoulder 13, additional force applied by the actuating screws serves to further compress the pin member between its upper end 23 and the tapered actuating surfaces 58a on the lock members or dogs.

The connector illustrated and described effects a metal-to-metal seal between the pin and box members, providing a tight rigid joint therebetween. The stored energy in the pin member 11 enables the connector to be subjected to a tensile load greater than the preloading or compression imposed upon the pin member after its end 23 has been forced against the box shoulder 13, which would result in the end of the pin member and the box member shoulder to begin to separate. However, the stored energy in the pin member results in its tapered end portion 24 shifting in an outward direction against the tapered seat 22 in the box member, still retaining a rigid joint between the pin member and box member and a metal-to-metal seal therebetween.

The screws 59 may each be locked in the positions to which they have been turned by a lock ring 80 having an opening 81 conforming to the shape of the screw head 61, a plurality of springs 82 tending to urge such lock ring outwardly against a retainer ring 83 rixed to the boss 60. The application of a suitable wrench (not shown) to the screw head forces and holds the lock ring 80 off the head, permitting the wrench to be turned in the appropriate direction for shifting the lock member 50 inwardly or withdrawing the lock member. The release of the wrench causes the springs 83 to return the lock ring to locked position with respect to the screw head 61. The automatic lock device forms no part of the present invention, being illustrated and described in the above-referred to U.S. of America Pat. No. 3,606,393, to which attention is directed.

By virtue of the connector illustrated and described, the pin and box members remain rigidly locked to one another under very high tensile load conditions, as well as under very high bending load conditions, and also under both high bending and high tensile load conditions applied simultaneously. The manner of connecting each locking dog 50 to its actuating screw prevents the tensile load exerted on the connector from being transferred to the actuating screw 59, since there is lost motion in a vertical direction between each lock dog and screw. The screws, however, can have a predetermined make-up torque applied to them for the purpose of exerting a continuing inward force on each lock dog 50 and also an upward compressive force on the pin member portion thereabove.

A connector, as illustrated, has been made in which the tapered upper sides 58 of the pin grooves make an angle a of 10 degrees to the plane 70 normal to the axis A of the pin member, the tapered side 22 of the pin member and tapered seat 15 on the box member making an angle b of 20° to the common axis A of the pin and box members. The angle a could be varied from about 20° to about 5° with the pin and box member mode of steel. However, some difficulties might be encountered with respect to manufacturing tolerances if the angle is made much less than 10°. Moreover, the transmission of torque becomes difficult when the angle a is greater than 15°.

With respect to the angle b, it can vary from about 10° to about 30°. Smaller angles produce some diffculties in connection with manufacturing tolerances; whereas, the larger angle referred to imposes some difficulties in connection with the transmission of torque between the screw 59 and the lock dog 50.

I claim:

1. In a connector: a metallic tubular pin member having an outer peipheral groove and a tapered end portion; a metallic tubular box member telescopically disposed over said pin member and having a tapered seat engaged by said end portion; lock means in said box member shiftable radially thereof into said groove; said pin member and lock means having coengageable tapered surfaces, said pin member surface being provided by a side of said groove; means for shifting said lock means radially inwardly of said groove to force said lock means tapered surface against said pin member tapered surface and shift said pin member axially of said box member to force said tapered end portion against said tapered seat and provide a metal-to-metal sealing contact therebetween; said tapered end portion and tapered seat being disposed at an angle of about 10° to 30° to the common axis of said pin member and box member; said coengageable tapered surfaces being disposed at an angle of about 5° to 20° to a plane normal to the common axis of said pin member and box member.

2. In a connector as defined in claim 1; said angle of disposition of said tapered end portion and tapered seat being about 20°; said angle of disposition of said coengageable tapered surfaces being about 10°.

3. In a connector as defined in claim 1; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder.

4. In a connector as defined in claim 1; said angle of disposition of said tapered end portion and tapered seat being about 20°; said angle of disposition of said coengageable tapered surfaces being about 10°; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder.

5. In a connector as defined in claim 1; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction.

6. In a connector as defined in claim 1; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction; said screws and lock members having coengageable means for moving said lock members radially outwardly of said pin member groove upon turning of said screws in the opposite direction.

7. In a connector as defined in claim 1; said angle of disposition of said tapered end portion and tapered seat being about 20°; said angle of disposition of said coengageable tapered surfaces being about 10°; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction.

8. In a connector as defined in claim 1; said angle of disposition of said tapered end portion and tapered seat being about 20°; said angle of disposition of said coengageable tapered surfaces being about 10°; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction; said screws and lock members having coengageable means for moving said lock members radially outwardly of said pin member groove upon turning of said screws in the opposite direction.

9. In a connector as defined in claim 1; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction.

10. In a connector as defined in claim 1; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction; said screws and lock members having coengageable means for moving said lock members radially outwardly of said pin member groove upon turning of said screws in the opposite direction.

11. In a connector as defined in claim 1; said angle of disposition of said tapered end portion and tapered seat being about 20°; said angle of disposition of said coengageable tapered surfaces being about 10°; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction.

12. In a connector as defined in claim 1; said angle of disposition of said tapered end portion and tapered seat being about 20°; said angle of disposition of said coengageable tapered surfaces being about 10°; said box member having a shoulder substantially normal to its axis at the smaller end of its tapered seat; said pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction; said screws and lock members having coengageable means for moving said lock members radially outwardly of said pin member groove upon turning of said screws in the opposite direction.

13. In a connector as defined in claim 1; said lock means comprising circumferentially spaced lock members slidable in said box member, said tapered surface of said lock means being on said lock members; said shifting means comprising screws threaded in said box member and engaging said lock members to urge said lock members radially inwardly upon turning of said screws in one direction; said pin member having a plurality of axially spaced outer peripheral grooves and a plurality of axially spaced tapered surfaces provided by sides of said grooves; said lock members having their tapered surfaces axially spaced from each other and simultaneously engaging said axially spaced tapered groove surfaces.

14. In a connector as defined in claim 1; said box member having a shoulder substantially normal to its axis at the smaller end of its tapered seat; sais pin member having an end surface substantially normal to its axis at the smaller end of its tapered end portion engageable in metal-to-metal contact with said box shoulder after engagement of said tapered end portion with said tapered seat; said shifting means and lock means being constructed and arranged to exert sufficient force on said pin member to axially slide said tapered end portion along said seat to deform said end portion radially inwardly to an extent limited by subsequent engagement of said pin member end surface with said shoulder; said lock means comprising circumferentially spaced lock members slidable in said box member, said tapered surface of said lock means being on said lock members; said shifting means comprising screws threaded in said box member and engaging said lock members to urge lock members radially inwardly upon turning of said screws in one direction; said pin member having a plurality of axially spaced outer peripheral grooves and a plurality of axially spaced tapered surfaces provided by sides of said grooves; said lock members having their tapered surfaces axially spaced from each other and simultaneously engaging said axially spaced tapered groove surfaces.

* * * * *